United States Patent
Lee

(10) Patent No.: US 8,265,001 B2
(45) Date of Patent: Sep. 11, 2012

(54) METHOD AND APPARATUS FOR COMMUNICATION OF MOBILE TERMINAL USING RELAY DEVICE

(75) Inventor: Min-ho Lee, Gwacheon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1211 days.

(21) Appl. No.: 12/049,636

(22) Filed: Mar. 17, 2008

(65) Prior Publication Data

US 2008/0279134 A1 Nov. 13, 2008

(30) Foreign Application Priority Data

May 10, 2007 (KR) .................. 10-2007-0045421

(51) Int. Cl.
*H04B 7/14* (2006.01)
(52) U.S. Cl. .................. 370/315; 370/328
(58) Field of Classification Search .......... 370/328–329, 370/331–333, 335–336, 338, 342–343, 400, 370/437, 441–442, 465
See application file for complete search history.

(56) References Cited

U.S. PATENT DOCUMENTS

| | | | |
|---|---|---|---|
| 7,092,363 B1 * | 8/2006 | Majidi-Ahy | 370/252 |
| 7,408,438 B2 * | 8/2008 | Izumi | 340/2.1 |
| 7,664,878 B2 * | 2/2010 | Takahashi et al. | 709/242 |
| 7,860,067 B2 * | 12/2010 | Na et al. | 370/338 |
| 2003/0125027 A1 * | 7/2003 | Gwon et al. | 455/436 |
| 2004/0242154 A1 * | 12/2004 | Takeda et al. | 455/16 |
| 2005/0018637 A1 * | 1/2005 | Karoubalis et al. | 370/338 |
| 2005/0197121 A1 * | 9/2005 | Fujiwara et al. | 455/435.1 |
| 2007/0086387 A1 * | 4/2007 | Kang et al. | 370/331 |
| 2007/0217364 A1 * | 9/2007 | Kawakami | 370/331 |
| 2008/0002631 A1 * | 1/2008 | Ramachandran | 370/338 |
| 2008/0108326 A1 * | 5/2008 | Park et al. | 455/411 |
| 2008/0108362 A1 * | 5/2008 | Bumiller | 455/450 |
| 2008/0112365 A1 * | 5/2008 | Kwun et al. | 370/332 |
| 2009/0209199 A1 * | 8/2009 | Suga | 455/7 |
| 2009/0219854 A1 * | 9/2009 | Okuda | 370/315 |
| 2009/0279701 A1 * | 11/2009 | Moisand et al. | 380/270 |
| 2011/0038284 A1 * | 2/2011 | Senarath et al. | 370/279 |

\* cited by examiner

*Primary Examiner* — Chi H. Pham
*Assistant Examiner* — Kevin Mew
(74) *Attorney, Agent, or Firm* — Staas & Halsey LLP

(57) ABSTRACT

A method and apparatus for allowing a mobile terminal to communicate using a relay device are provided. In the method, whether a communication environment between a base station and the relay device changes is determined so that information representing the change in the communication environment is selectively created, and then a communication environment between the relay device and the mobile terminal is controlled based on the created information.

25 Claims, 7 Drawing Sheets

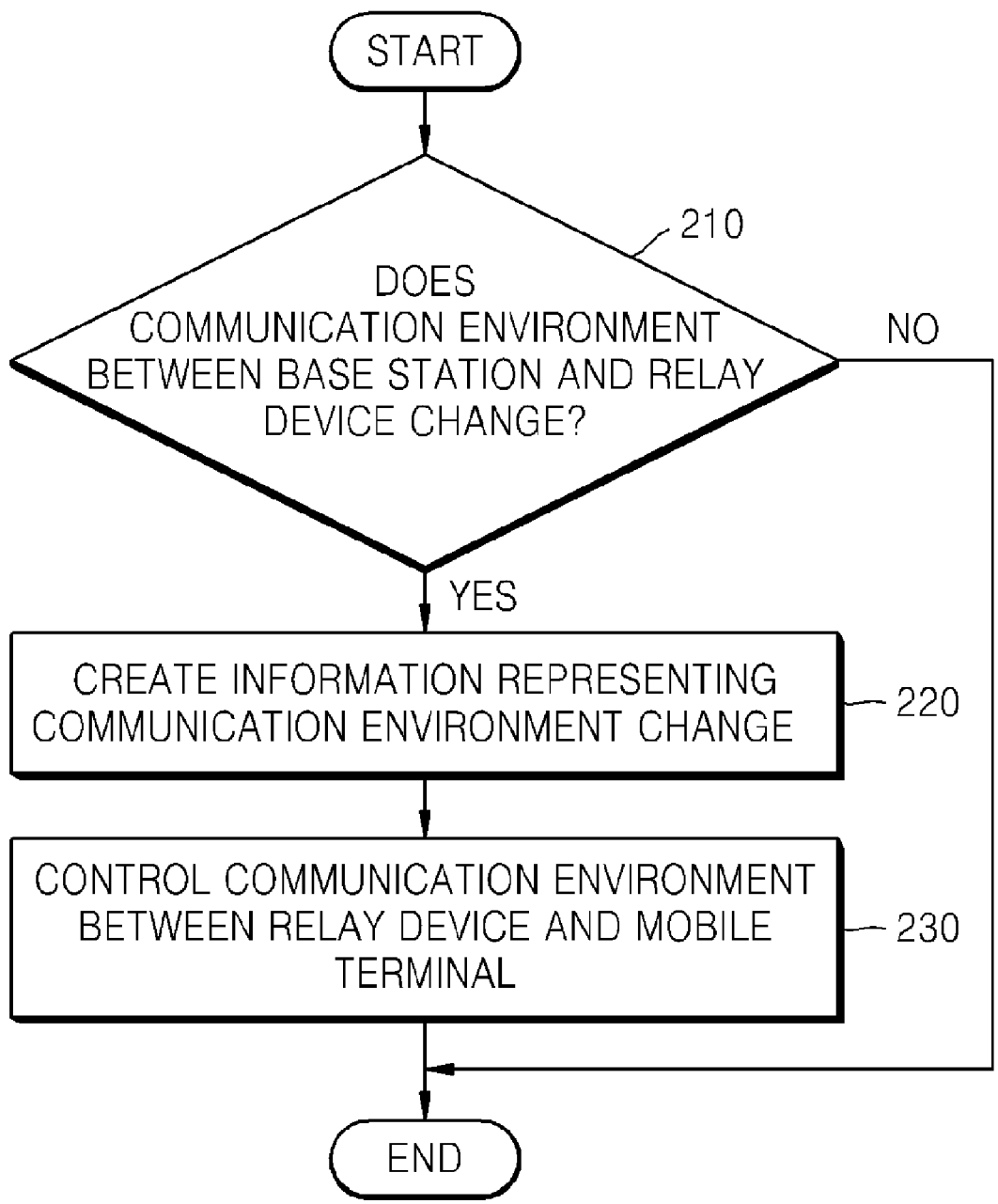

METHOD AND APPARATUS FOR COMMUNICATION OF MOBILE TERMINAL USING RELAY DEVICE

CROSS-REFERENCE TO RELATED APPLICATIONS

This application claims all benefits accruing under 35 U.S.C. §119 from Korean Patent Application No. 2007-45421, filed on May 10, 2007, in the Korean Intellectual Property Office, the disclosure of which is incorporated herein by reference.

BACKGROUND OF THE INVENTION

1. Field of the Invention

The present invention relates to a method of communicating using a mobile terminal, and more particularly, to a method and apparatus for communication of a mobile terminal by using a relay device.

2. Related Art

Advances in wireless communication technologies have triggered a need to continue communication while walking or moving via a vehicle, rather than simply communicating using a mobile terminal. One of the most important technical aspects of communicating during movement is seamless access to a distributed network such as the Internet.

In particular, research has been actively conducted into a method of continuously receiving Internet services by establishing a seamless connection between various types of network equipments. Even if during data communication, a mobile terminal not only moves within a network but also moves from one network to another network, handover must be efficient to continuously maintain seamless communication.

For a fast handover, which is the core part of research into handover techniques, "layer2 (L2) information" or information called "L2 trigger information" needs to be obtained from a network equipment. However, as types of wireless network equipments have increased and a tendency toward compact mobile terminals has spread, it is difficult to include all network equipments into a single mobile terminal.

In addition, as networking equipment can be installed in various types of vehicles, thus allowing a mobile terminal to receive networking services, a reconnection between the network equipment and the mobile terminal, that is, a connection between the network equipment and the mobile terminal in a cascade fashion via a relay device, has gradually increased.

Since wireless network equipment is basically installed in a mobile terminal that can be connected to a vehicle in a cascade fashion, via wire or wirelessly, the mobile terminal may establish connection, via not only a relay device but also wireless networking equipment included in the mobile terminal. Thus, a handover needs to be performed between the mobile terminal and the network equipment.

However, if the relay device and the mobile terminal are connected via wire, wired networking equipment does not have a function of providing L2 trigger information and thus cannot perform a fast handover. Conversely, if the relay device and the mobile terminal are connected wirelessly, the mobile terminal is not capable of determining whether a communication environment between the relay device and a base station changes and thus also cannot perform a fast handover.

FIG. 1A is a diagram illustrating an example of a conventional communication apparatus using a relay device. Referring to FIG. 1A, the conventional communication apparatus includes a base station 112, a relay device 114, and a mobile terminal 116 that is connected to the relay device 114, via wire.

The base station 112 communicates with the mobile terminal 116, via the relay device 114. The relay device 114 receives a signal from the base station 112, via a wireless network, and transmits the signal received from the base station 112 to the mobile terminal 116. The relay device 114 can be installed in various types of movable platforms, e.g., a movable platform 119, such as, for example, an automobile, a plane, or a ship that is moving from one service area to another service area within the wireless network or between different wireless networks. In the current embodiment, the relay device 114 is installed at a particular location of a movable platform 119 (vehicle), and then communicates with the base station 112 wirelessly, via a wireless network, and then communicates with the mobile terminal 116, via wire.

A wireless network module including an antenna is installed at a side of the relay device 114 in order to communicate with the base station 112, via a wireless network. In addition, the relay device 114 includes a wired network interface in order to communicate with the mobile terminal 116, via a wireless network. In an example embodiment, a network via the Ethernet is used as a wired network.

The mobile terminal 116 includes a wired network interface in order to communicate with the relay device 114, and the wired network interface is connected to the wired network interface of the relay device 114. In addition to the wired network interface, the mobile terminal 116 includes at least one of a plurality of wireless network interfaces, such as, for example, a wireless local area network (LAN), CDMA (Code Division Multiple Access), HSDPA (High Speed Downlink Packet Access) and WiBro (Wireless Broadband Internet) to communicate with the base station 112, via the relay device 114.

A connector for interfacing, which is connected to an end of an unshielded twisted pair (UTP) cable that is a part of the Ethernet, is connected to a mobile terminal 116 in order to allow the mobile terminal 116 to use networking, via the Ethernet. If the connector connected to the UTP cable is separated from the mobile terminal 116, the mobile terminal 116 cannot use the networking function of the Ethernet any longer. Thus, an Ethernet module included in the mobile terminal 116 connected to the relay device 114, via wire, can determine only whether the Ethernet is available by checking whether the connector is connected to the mobile terminal 116.

Since wired networking basically operates in a fixed mode, unlike wireless networking, no method has been introduced to solve a problem that the intensity of signal becomes weak in inverse proportion to the distance between the base station 112 and the mobile terminal 114. This is because wired networking can use another relay device even if the intensity of a signal becomes weak since the distance between the relay device 114 and the mobile terminal 116 is great when wired networking operates in the fixed mode.

However, if the relay device 114 leaves a service region of the base station 112 due to movement of a movable platform 119, i.e., a vehicle, wireless networking may not be performed between the relay device 114 and the base station 112. In this case, the mobile terminal 116 connected to the relay device 114, via wire, cannot access the Internet.

Communication is established between the relay device 114 and the mobile terminal 116 by using wired networking within the movable platform 119, i.e., a vehicle. However, it is impossible to determine whether the state of wireless networking between the relay device 114 and the base station 112 is good, unless the UTP cable is separated from the mobile terminal 116. Accordingly, the mobile terminal 116 cannot rapidly perform a handover from the Ethernet to another communication environment, such as, HSDPA, CDMA or WiBro.

Handover is a technique in which the Internet can be seamlessly accessed when the mobile terminal 116 moves from one service region to another service region.

For example, it is assumed that networking services are received, via a terminal device, in which all various types of wireless network equipments (wireless LAN, CDMA, HSDPA, etc.) are installed. In this case, services are received in a wireless LAN service region, via a wireless LAN; however, if the mobile terminal 116 leaves the wireless LAN service region, Internet services can be seamlessly received using HSDPA or CDMA in which the speed of data transmission is low and services are provided at high cost although the range of the service region is large. Such a technique is called "handover".

In order to reduce occurrences of a disconnection phenomenon during a handover, it is necessary to receive information indicating whether the mobile terminal 116 leaves the service region of the base station 112, which is referred to as the L2 information or L2 trigger.

Wireless communication may be established by reconnecting a mobile terminal 116 to a base station 112, via a relay device, rather than by directly connecting the mobile terminal 116 to the base station 112. The quality of wireless communication using even the same wireless technology depends on whether the mobile terminal 116 is connected to the base station 112 directly, or via a relay device 114, such as an antenna for vehicles. In particular, in the case of a ship or a plane, a wireless Internet service cannot be provided, via direct connection, to the base station 112, and thus, reconnection needs to be performed, via the relay device 114.

Thus, the relay device 114 is installed in a movable platform 119, such as, an automobile. However, if the relay device 114 leaves a service region of the base station 112 due to movement of the movable platform 119, the mobile terminal 116 cannot receive a service under such a communication environment. Thus, a handover must be performed to another communication environment that is available to the mobile terminal 116. However, in the case of networking via the relay device 114, the L2 trigger information is not transmitted to the mobile terminal 116, thus preventing a fast handover from being performed.

FIG. 1B is a diagram illustrating another example of a conventional communication apparatus using a relay device. Referring to FIG. 1B, the conventional communication apparatus includes a base station 122, a relay device 124, and a mobile terminal 126 that is wirelessly connected to the relay device 124.

The base station 122 communicates with the mobile terminal 126, via the relay device 124. The relay device 124 receives a signal from the base station 122, via a wireless network, and transmits the signal received from the base station 122 to the mobile terminal 126. The relay device 124 can also be installed at a movable platform 129, such as, for example, an automobile, a plane, or a ship that is moving from one service area to another service area within the wireless network or between different wireless networks. The relay device 124 includes a wireless network module including an antenna installed at one side of the relay device 124 in order to communicate with the base station 122, and a wireless network interface arranged in order to communicate with the mobile terminal 126.

The mobile terminal 126 includes a wireless network interface for communicating with the relay device 124. In addition to the wireless network interface to communicate with the relay device 124, the mobile terminal 126 also includes at least two of a plurality of wireless interfaces, such as CDMA, HSDPA, and WiBro, to communicate with the base station 122, via the relay device 124.

The conventional communication apparatus illustrated in FIG. 1B is the same as the conventional communication apparatus illustrated in FIG. 1A, except that the relay device 124 and the mobile terminal 126 are connected via a wireless network rather than via a wired network.

Even if the mobile terminal 126 is wirelessly connected to the relay device 124, the quality of communication is always satisfactory irrespective of whether communication is seamlessly established between the relay device 124 and the base station 122. This is because the mobile terminal 126 is capable of determining a communication environment by using, for example, a beacon signal, which is received from the relay device 124. However, the mobile terminal 126 cannot detect the state of communication between the relay device 124 and the base station 122.

Accordingly, the mobile terminal 126 cannot perform a fast handover. That is, the mobile terminal 126 cannot perform a handover until communication is completely discontinued between the relay device 124 and the base station 122 and, thus, undergoes a discontinuity in communication for a significantly long period of time.

As described in connection with FIGS. 1A-1B, in a conventional communication apparatus using a relay device, a mobile terminal is not capable of determining whether a communication environment between the relay device and a base station changes and, thus, cannot perform a fast handover.

SUMMARY OF THE INVENTION

Several aspects and example embodiments of the present invention provide a method and apparatus for allowing a mobile terminal to seamlessly receive communication services from a base station by controlling a communication environment between a relay device and the mobile terminal based on information regarding a change in a communication environment between the relay device and the base station.

Additional aspects and/or advantages of the invention will be set forth in part in the description which follows and, in part, will be obvious from the description, or may be learned by practice of the invention.

In accordance with an example embodiment of the present invention, there is provided a method of allowing a relay device installed on a movable platform with a mobile terminal to relay communication between a base station and a mobile terminal. Such a method comprises determining whether a communication environment between the base station and the relay device changes; selectively creating information representing a change in the communication environment, based on the determination; and controlling a communication environment between the relay device and the mobile terminal, based on the created information.

According to an aspect of the present invention, the controlling of the communication environment may comprise controlling a handover to another communication environment that is available to the mobile terminal.

According to another aspect of the present invention, the created information may comprise L2 trigger information representing a change in a parameter value of a second layer (L2) according to the IEEE (Institute of Electrical and Electronic Engineers) 802.11 standards.

According to an aspect of the present invention, the determining of whether a communication environment between the base station and the relay device changes may be performed based on the intensity of a signal received from the base station or a total number of beacon signals received from the base station per unit time.

According to an aspect of the present invention, if the created information is L2 trigger information, the controlling of the communication environment may comprise disconnecting the mobile terminal from the relay device when the relay device and the mobile terminal are connected via wire.

According to another aspect of the present invention, if the created information is L2 trigger information, the controlling of the communication environment may comprise weakening the intensity of a signal transmitted from the relay device to the mobile terminal when the relay device and the mobile terminal are wirelessly connected.

According to yet another aspect of the present invention, if the created information is L2 trigger information, the controlling of the communication environment may comprise setting a period of time during which a radio frequency (RF) signal is transmitted to the mobile terminal to be longer than a predetermined transmission period in order to determine whether the state of a wireless channel is good, when the relay device and the mobile terminal are wirelessly connected.

According to an aspect of the present invention, the radio frequency (RF) signal transmitted to the mobile terminal in order to determine whether the state of the wireless channel is good may be a beacon signal.

In accordance with another example embodiment of the present invention, there is provided a method of allowing a relay device installed on a movable platform with a mobile terminal to relay communication between a base station and the mobile terminal. Such a method comprises determining whether a communication environment between the base station and the relay device changes; selectively creating information representing a change in the communication environment according to the determination; and transmitting the created information to the mobile terminal in order to control a communication environment between the relay device and the mobile terminal based on the change in the communication environment.

In accordance with yet another example embodiment of the present invention, there is provided a method of allowing a mobile terminal to communicate with a base station via a relay device installed on a movable platform with the mobile terminal. Such a method comprises if a communication environment between the base station and the relay device changes, receiving information representing the communication environment change from the relay device; and controlling a communication environment between the relay device and the mobile terminal based on the received information.

According to an aspect of the present invention, if the received information is first L2 trigger information representing a change in a parameter value of a second layer (L2) according to the IEEE 802.11 standards that are used between the base station and the relay device, the controlling of the communication environment may comprise creating second L2 trigger information representing a change in a parameter value of a second layer according to the IEEE 802.11 standards that are used between the relay device and the mobile terminal, and then performing a handover to another communication environment that is available to the mobile terminal, based on the created information.

In addition to the example embodiments and aspects as described above, further aspects and example embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 2 is a flowchart illustrating a method of allowing a relay device to relay communication between a base station and a mobile terminal, according to an example embodiment of the present invention;

DETAILED DESCRIPTION OF THE EMBODIMENTS

Figure 1A:
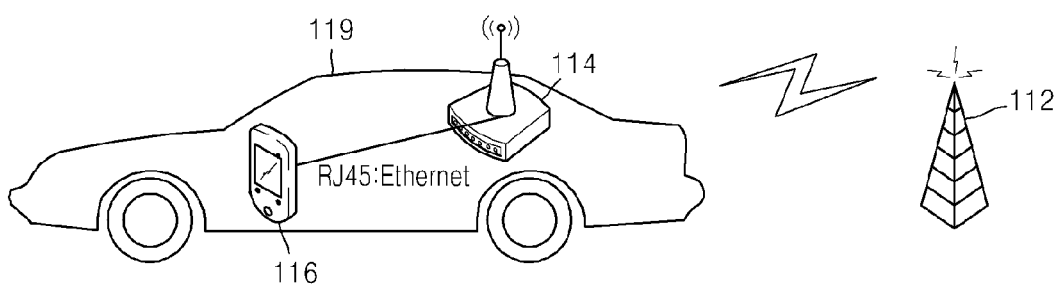
FIG. 1A is a diagram illustrating an example of a conventional communication apparatus using a relay device.
Figure 1B:
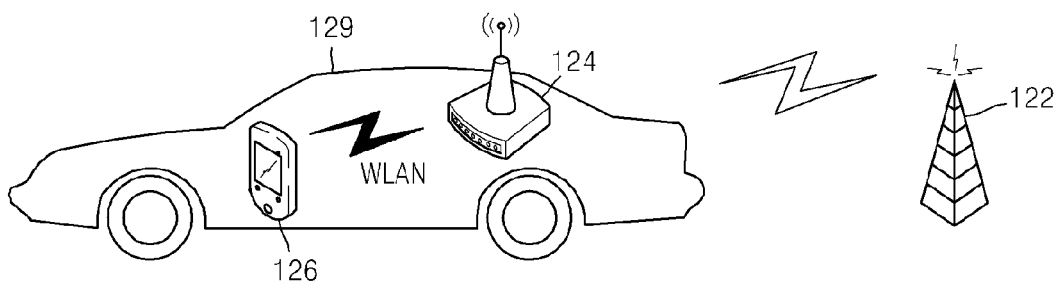
FIG. 1B is a diagram illustrating another example of a conventional communication apparatus using a relay device.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 2 is a flowchart illustrating a method of allowing a relay device to relay communication between a base station and a mobile terminal, according to an example embodiment of the present invention. As shown in FIG. 2, whether a communication environment between the base station and the relay device changes is determined in operation 210. For example, whether a parameter value of a second layer (L2) according to the IEEE 802.11 standards changes is determined. Whether the parameter value of the L2 according to the IEEE 802.11 standards may be determined based on the intensity of a signal received from the base station or the total number of beacon signals received from the base station per unit time.

When the communication environment changes between the base station and the relay device changes, information regarding a communication environment change is created selectively in operation 220. For example, if the change in the communication environment between the base station and the relay device leads to a change in the parameter value of the L2 according to the IEEE 802.11 standards, L2 trigger information is created. Since the parameter value of the L2 according to the IEEE 802.11 standards changes according to the total number of received beacon signals or the intensity of a received signal, it is possible to determine when the relay device leaves a service region of the base station.

In operation 230, a communication environment between the relay device and the mobile terminal is controlled based on the L2 trigger information created in operation 220. For example, control of a handover to another communication environment that is available to a mobile terminal, is performed. For a fast handover, a handover must be performed before communication between the base station and the relay device is completely discontinued. Thus, if a change in the communication environment between the base station and the relay device results in creation of the L2 trigger information, the communication environment between the mobile terminal and the relay device needs to be controlled so that the mobile terminal can perform a handover.

There are a variety of ways of controlling the communication environment between the mobile terminal and the relay device based on the created information. Several example embodiments of a method of controlling a communication environment between a relay device and a mobile terminal so that a handover is performed to another communication environment that is available to the mobile terminal when L2 trigger information is created, i.e., when the relay device deviates from a service region of a base station, will now be described.

In one example embodiment of the present invention, if a relay device is connected to a mobile terminal via wire, it is possible to control a connection between the relay device and the mobile terminal to be disconnected.

In another example embodiment of the present invention, if a relay device is wirelessly connected to a mobile terminal, it is possible to weaken the intensity of a signal transmitted from the relay device to the mobile terminal.

In yet another example embodiment of the present invention, if a relay device is wirelessly connected to a mobile terminal, it is possible to increase a period of time during which a radio-frequency (RF) signal is transmitted to the mobile terminal at predetermined intervals in order to determine whether the state of a wireless channel is good. In this case, an example of the RF signal transmitted to the mobile terminal in order to determine the state of the wireless channel is a beacon signal. The beacon signal contains various types of information for communication, and the state of the wireless channel can be determined based on the total number of beacon signals received per unit time.

If the communication environment between the relay device and the mobile terminal is controlled as described above, the mobile terminal considers a receiving state to be deteriorating and thus creates L2 trigger information. Then, the mobile terminal performs a handover using the L2 trigger information thereby continuing communication without having to wait until communication is completely discontinued between the relay device and the base station.

Alternatively, the information created in operation 220 may be simply transmitted to the mobile terminal without controlling the relay device and the mobile terminal by using the created information. In this case, the mobile terminal receiving the information controls the communication environment between the relay device and the mobile terminal based on the received information, which will now be described with reference to FIG. 3.

Figure 3:
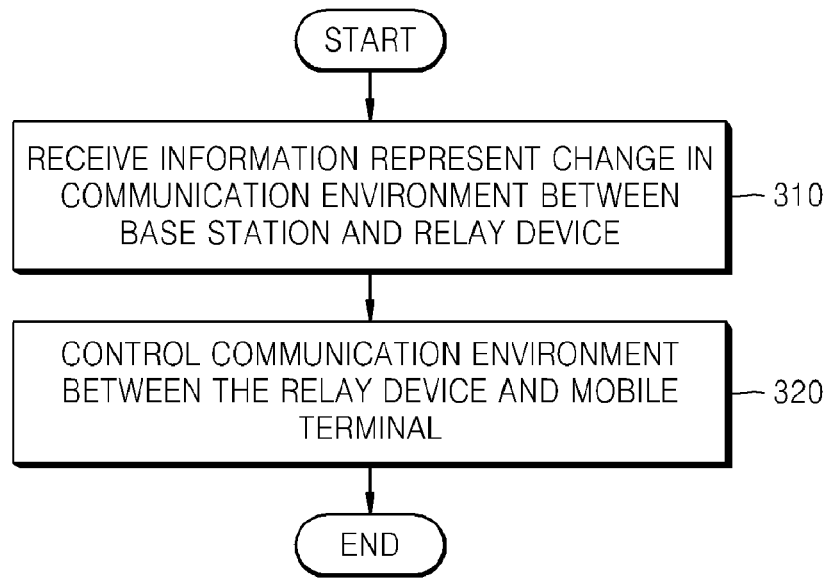
FIG. 3 is a flowchart illustrating a method of allowing a mobile terminal to communicate with a base station via a relay device, according to an example embodiment of the present invention.

FIG. 3 is a flowchart illustrating a method of establishing communication between a mobile terminal and a base station via a relay device, according to an example embodiment of the present invention.

In operation 310, the mobile terminal receives information representing a change in a communication environment between the base station and the relay device if the communication environment between the base station and the relay device changes. There may be various types of information representing a change in a communication environment between a base station and a relay device. For example, the information may be first L2 trigger information that represents a change in a parameter value of a L2 according to the IEEE 802.11 standards used between a base station and a relay device.

In operation 320, the mobile terminal controls a communication environment between the relay device and the mobile terminal, based on the information received in operation 310. More specifically, in operation 320, if the information received in operation 310 is the first L2 trigger information, the mobile terminal creates second L2 trigger information representing a change in the parameter value of the L2 according to the IEEE 802.11 standards used between the relay device and the mobile terminal, and then performs a handover to another communication environment that is available to the mobile terminal, based on the second L2 trigger information.

In another example embodiment of the present invention, in operation 310, if the communication environment is determined to be deteriorating based on the total number of received beacon signals and the intensity of a received signal, the relay device creates the first L2 trigger information and the mobile terminal receives the first L2 trigger information from the relay device.

In operation 320, the second L2 trigger information is created. If the second L2 trigger information is created, the communication environment between the relay device and the mobile terminal is determined to have deteriorated. Therefore, the mobile terminal performs a handover to another available communication environment. For example, if a network between the relay device and the mobile terminal is a wireless LAN (WLAN), a handover to another network is performed, e.g., HSDPA, which is available to the mobile terminal.

As described above, it is possible to solve a problem that even if a communication environment between a base station and a relay device deteriorates, a fast handover cannot be performed since the state of a communication environment between the relay device and a mobile terminal is still good.

Figure 4:
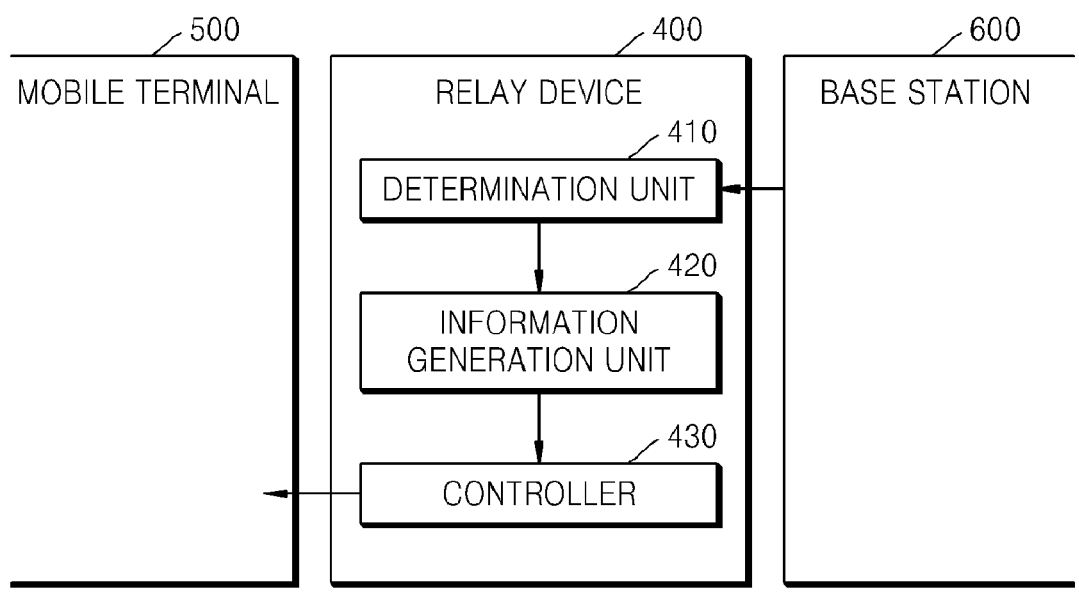
FIG. 4 is a block diagram of a relay device that relays communication between a base station and a mobile terminal, according to an example embodiment of the present invention.

FIG. 4 is a block diagram of a relay device 400 that relays communication between a mobile terminal 500 and a base station 600 according to an example embodiment of the present invention. Referring to FIG. 4, the relay device 400 includes a determination unit 410, an information generation unit 420, and a controller 430.

The determination unit 410 determines whether a communication environment between a base station 600 and the relay device 400 changes. In an example embodiment of the present invention, the determination unit 410 determines whether the communication environment changes, based on the intensity of a signal received from the base station 600, or the total number of beacon signals received from the base station 600 per unit time.

The information generation unit 420 selectively creates information representing the communication environment change according to the determination of the determination unit 410. In an example embodiment of the present invention, if the determination unit 410 determines that a parameter value of a second layer (L2) according to the IEEE 802.11 standards changes, the information generation unit 420 creates L2 trigger information.

The controller 430 controls a communication environment between the base station 600 and the mobile terminal 500 based on the information created by the information generation unit 420. For example, the controller 430 may control a handover to another communication environment that is available to the mobile terminal 500.

Figure 5:
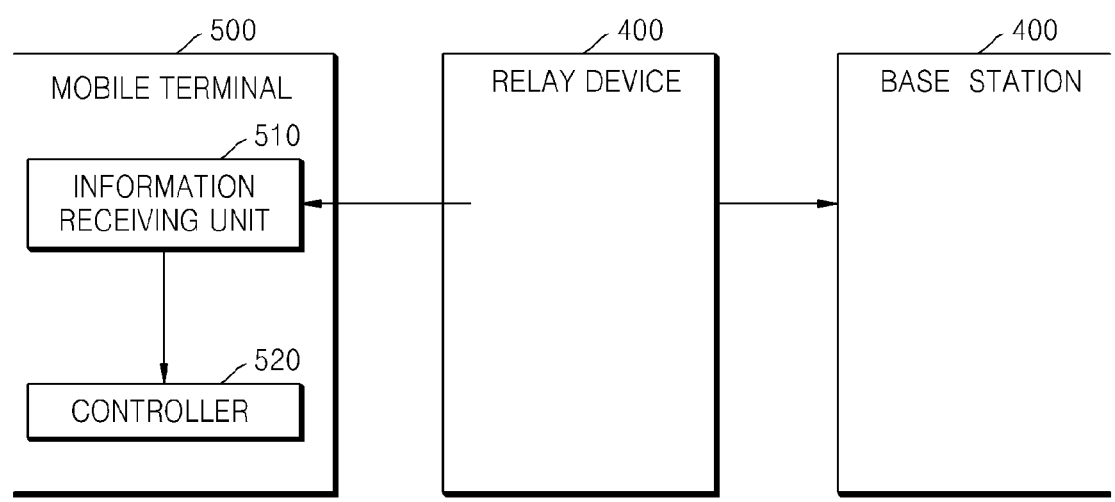
FIG. 5 is a block diagram of a mobile terminal for communicating with a base station via a relay device, according to an example embodiment of the present invention.

FIG. 5 is a block diagram of a mobile terminal 500 for communicating with a base station 600 by using a relay device 400, according to an example embodiment of the present invention. Referring to FIG. 5, the mobile terminal 500 includes an information receiving unit 510 and a controller 520.

If a communication environment between a base station 600 and a relay device 400 changes, the information receiving unit 510 receives information representing the communication environment change from the relay device 400.

The controller 520 controls a communication environment between the relay device 400 and the mobile terminal 500, based on the received information.

If the information is first L2 trigger information representing a change in a parameter value of a second layer (L2) according to the IEEE 802.11 standards used between the base station 600 and the relay device 400, the controller 520 creates second L2 trigger information representing a change in a parameter value of a L2 according to the IEEE 802.11 standards used between the relay device 400 and the mobile terminal 500, and then performs a handover to another communication environment that is available to the mobile terminal 500, based on the created information.

Figure 6:
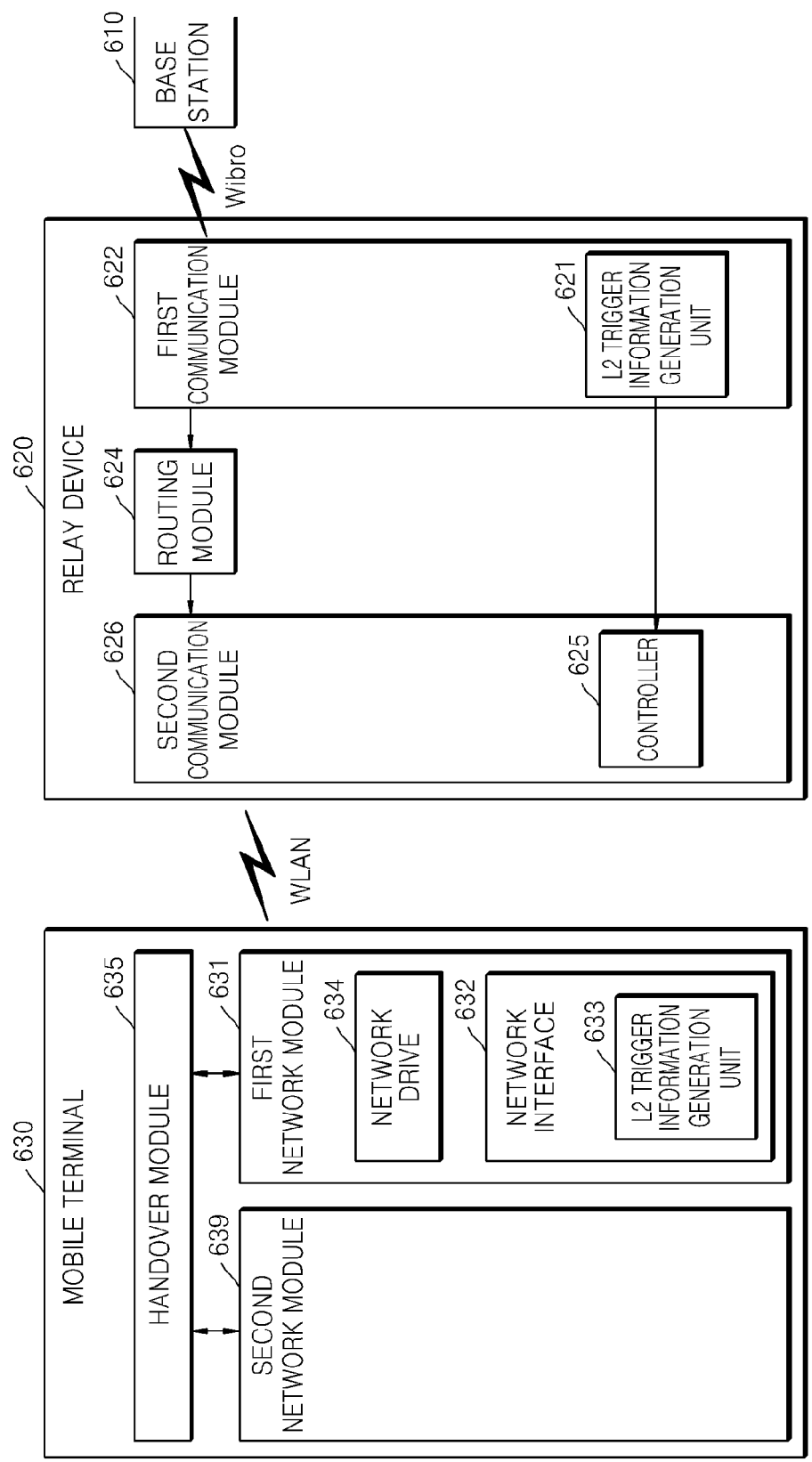
FIG. 6 is a block diagram of a communication system using a relay device, according to an example embodiment of the present invention.

FIG. 6 is a block diagram of a communication system using a relay device according to an example embodiment of the present invention. Referring to FIG. 6, the communication system includes a base station 610, a relay device 620, and a mobile terminal 630.

The base station 610 forms a wireless network together with the relay device 620, and transmits or receives necessary information or signals to the mobile terminal 630, via the relay device 620.

The relay device 620 includes a first communication module 622, a routing module 624, and a second communication module 626.

The first communication module 622 communicates with the base station 610, and includes a L2 trigger information generation unit 621 used to create L2 trigger information, when a parameter value of a second layer (L2) between the base station 610 and the relay device 620 changes.

The routing module 624 is arranged to perform a routing operation. In the current embodiment, the relay device 620 employs a mobile router, i.e., the routing module 624, but the present invention is not limited thereto.

The second communication module 626 communicates with the mobile terminal 630, and includes a controller 625 used to control a communication environment between the relay device 620 and the mobile terminal 630.

Upon receipt of the L2 trigger information from the L2 trigger information generation unit 621, the controller 625 controls an L2 trigger parameter between the relay device 620 and the mobile terminal 630 in order to change the communication environment that is available to the mobile terminal 630.

The mobile terminal 630 includes a first network module 631, a second network module 639, and a handover module 635.

The first network module 631 is equipment used for communicating with the relay device 620. The first network module 631 includes a network interface 632 and a network drive 634.

The network interface 632 provides an interface via which communication can be performed by connecting to the relay device 620. The network interface 632 includes an L2 trigger information generation unit 633.

The L2 trigger information generation unit 633 creates L2 trigger information when a change in a communication environment between the relay device 620 and the mobile terminal 630 leads to a change in a parameter value of a second layer according to the IEEE 802.11 standards.

The network drive 634 provides a drive so that the relay device 620 and the mobile terminal 630 can communicate with each other.

The second network module 639 allows the mobile terminal 630 to communicate using another communication environment. The construction of the second network module 639 may be the same as that of the first network module 631.

The handover module 635 receives a predetermined signal from the first network module 631, and changes networking using the first network module 631 to networking using the second network module 639.

The communication system according to an example embodiment of the present invention will now be described in greater detail with reference to FIG. 6.

In the current embodiment, the relay device 620 performs communication with the base station 610 and the mobile terminal 630, while being mounted in a movable platform, such as a vehicle. If movement of the relay device 620 deteriorates the quality of communication between the relay device 620 and the base station 610, the L2 trigger information generation unit 621 in the relay device 620 creates L2 trigger information.

The controller 625 in the relay device 620 receives the L2 trigger information from the L2 trigger information generation unit 621, and then controls the communication environment between the mobile terminal 630 and the relay device 620. For example, the controller 625 in the relay device 620 disconnects the mobile terminal 630 and the relay device 620 from each other if the mobile terminal 630 is connected to the relay device 620 via wire. If the mobile terminal 630 is wirelessly connected to the relay device 620, the intensity of an RF signal that is to be transmitted to the mobile terminal 630 is weakened or a period of time during which a beacon signal is transmitted is increased.

Then, under control of the controller 625, the mobile terminal 630 senses that the intensity of the RF signal received from the relay device 620 is weakened or the total number of beacon signals transmitted per unit time decreases, which means that the quality of the communication between the relay device 620 and the mobile terminal 630 deteriorates. Thus, the L2 trigger information generation unit 633 in the mobile terminal 630 creates L2 trigger information.

The created L2 trigger information is transmitted to the handover module 635, and then the handover module 635 performs a handover to another communication environment that is available to the mobile terminal 630. Thus, the mobile terminal 630 is disconnected from the relay device 620 and then performs communication in the available communication environment using the second network module 639.

For example, if the mobile terminal 630 communicates with the relay device 620 by using a WLAN, the handover module 635 is disconnected from the relay device 620 and then performs a handover to an HSDPA communication environment using the second network module 639. Therefore, the mobile terminal 630 can continue communication seamlessly by performing a fast handover.

Figure 7:
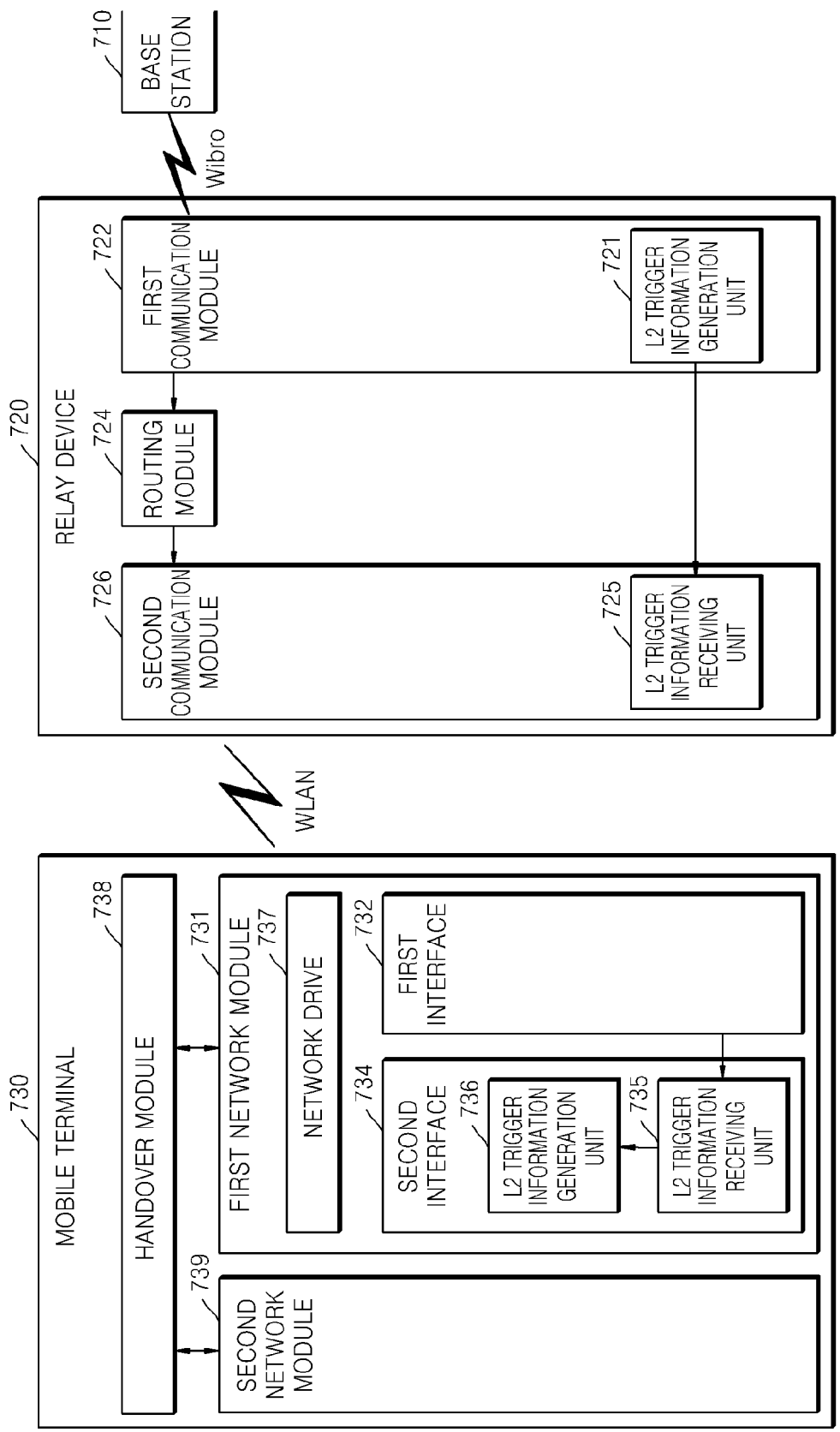
FIG. 7 is a block diagram of a communication system using a relay device, according to another example embodiment of the present invention.

FIG. 7 is a block diagram of a communication system using a relay device according to another example embodiment of the present invention. Referring to FIG. 7, the communication system includes a base station 710, a relay device 720, and a mobile terminal 730.

The operations of the base station 710, an L2 trigger information generation unit 721 included in the relay device 720, a first communication module 722, and a routing module 724 are as described above with reference to FIG. 6, and thus, a detailed description thereof will be omitted here.

The second communication module 726 includes an L2 trigger information transmission unit 725. The L2 trigger information transmission unit 725 receives L2 trigger information from the L2 trigger information generation unit 721, transforms the same into an appropriate format, and then transmits the transformed information so that the mobile terminal 730 can receive the L2 trigger information. The L2 trigger information may be transmitted in a format of L2 or lower, such as a logic link control (LLC) message or an address resolution protocol (ARP).

The mobile terminal 730 is the same as the mobile terminal 630 illustrated in FIG. 6, except for a first interface 732 and a second interface 734. The first interface 732 receives the information from the L2 trigger information transmission unit 725 of the relay device 720 and then provides the same to the second interface 734. The second interface 734 includes an L2 trigger information receiving unit 735 and an L2 trigger information generation unit 736. In the current embodiment, the second interface 734 is included, but it would be obvious to those of ordinary skill in the art that the first interface 732 could be altered to include the operation of the second interface 734 without additionally including the second interface 734.

The L2 trigger information receiving unit 735 deciphers the information received from the first interface 732 and then transmits the result of deciphering to the L2 trigger information generation unit 736 included in the mobile terminal 730.

The L2 trigger information generation unit 736 creates L2 trigger information representing a change in a parameter value of a second layer according to the IEEE 802.11 standards that is used between the relay device 720 and the mobile terminal 730, using the received information.

The communication system according to another example embodiment of the present invention will now be described in greater detail with reference to FIG. 7.

If movement of the relay device 720 deteriorates the quality of communication between the relay device 720 and the base station 710, the L2 trigger information generation unit 721 in the relay device 720 creates first L2 trigger information.

The L2 trigger information transmission unit 725 in the relay device 720 receives the first L2 trigger information, transforms the same into a proper format, such as an LLC message, and then transmits the transformed information to the mobile terminal 730.

The L2 trigger information receiving unit 735 in the mobile terminal 730 receives the transmitted information and provides the same to the L2 trigger information generation unit 736. Then, the L2 trigger information generation unit 736 creates second L2 trigger information, and the created information is transmitted to the handover module 738.

The handover module 738 performs a handover to another communication environment that is available to the mobile terminal 730. Thus, the mobile terminal 730 is disconnected from the relay device 720, and performs communication in the new communication environment by using the second network device 739.

Figure 8:
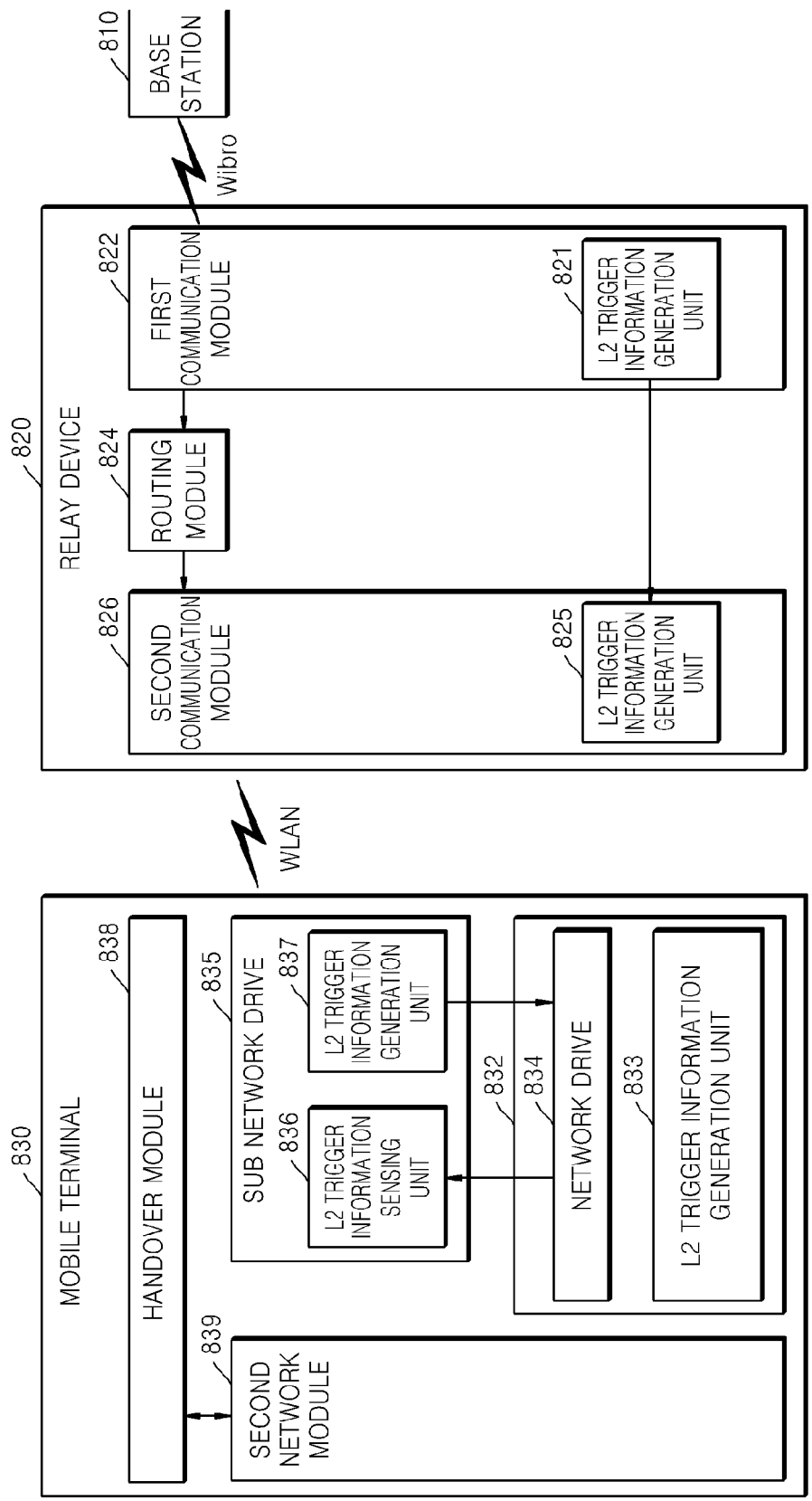
FIG. 8 is a block diagram of a communication system using a relay device, according to another example embodiment of the present invention.

FIG. 8 is a block diagram of a communication system using a relay device according to another example embodiment of the present invention. Compared to the communication system illustrated in FIG. 7, the mobile terminal 830 of the communication system, as illustrated in FIG. 8, not only includes a single interface 832 but further includes a sub network drive 835. The sub network drive 835 can be embodied as software and thus can perform an operation according to the present invention without changing the physical construction of the present invention.

As shown in FIG. 8, the sub network drive 835 includes an L2 trigger information sensing unit 836 and an L2 trigger information generation unit 837.

The L2 trigger information sensing unit 836 receives first L2 trigger information created due to a change in a communication environment between a base station 810 and a relay device 820. That is, the first L2 trigger information created by an L2 trigger information generation unit 821 included in the relay device 820 is transmitted to the sub network drive 835 without being processed. As a result, the L2 trigger information sensing unit 836 included in the mobile terminal 830 senses the first L2 trigger information created in the relay device 820. For example, the transmitted L2 trigger information may be either an Internet control message protocol (ICMP) in a format of a third layer (L3) or higher, or an LLC message in a format of L2 or lower.

The L2 trigger information sensing unit 836 then transmits the sensed first L2 trigger information generated by the relay device 820 to the L2 trigger information generation unit 837 in the sub network drive 835.

The L2 trigger information generation unit 837 in the sub network drive 835 creates second L2 trigger information, and the created second L2 trigger information is transmitted to the handover module 838, via the network drive 834.

The handover module 838 performs a handover to another communication environment that is available to the mobile terminal 830. Thus, the mobile terminal 830 is disconnected from the relay device 820, and then performs communication in the new communication environment by using the second network module 839.

The above embodiments of the present invention can be embodied as a computer readable program and accomplished using a general digital computer via a computer readable medium. The computer readable medium may be a magnetic recording medium (a ROM, a floppy disk, a hard disc, etc.), an optical recording medium (a CD-ROM, a DVD, etc.), or a carrier wave medium that transmits data via the Internet.

As described above, according to the present invention, a mobile terminal is allowed to determine the state of an external network between a relay device and a base station and can thus appropriately deal with an environmental change in the external network. In particular, it is possible to solve a problem that a mobile terminal cannot perform a fast handover since it cannot determine the state of an external network between a relay device and a base station.

Various components of the relay device, the base station and the mobile terminal, as shown in FIG. 4, FIG. 5, FIG. 6, FIG. 7 and FIG. 8, can be integrated into a single control unit, or alternatively, can be implemented in software or hardware, such as, for example, a field programmable gate array (FPGA) and an application specific integrated circuit (ASIC). For example, the determination unit 410, the information generation unit 420 and the controller 430 included in the relay device 400, as shown in FIG. 4, can be integrated into a single controller or implemented in software. Similarly, the first communication module 622, the routing module 624 and the second communication module 626 included in the relay device 640, as shown in FIG. 6, can be implemented in software or hardware, such as, for example, a field programmable gate array (FPGA) and an application specific integrated circuit (ASIC). Likewise, the first network module 631, the handover module 635 and the second network module 639 included in the mobile terminal 630 can also be implemented in software or hardware, such as, for example, a field programmable gate array (FPGA) and an application specific integrated circuit (ASIC). Similarly, different modules included in the relay device and the mobile terminal, shown in FIG. 7 and FIG. 8, can also be implemented in software or hardware, such as, for example, a field programmable gate array (FPGA) and an application specific integrated circuit (ASIC). As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

In addition, the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. A method of allowing a relay device to relay communication between a base station and a mobile terminal, the method comprising:
   determining whether a communication environment between the base station and the relay device changes;
   selectively creating information representing a change in the communication environment, based on the determination; and
   controlling, using a computer, a communication environment between the relay device and the mobile terminal, based on created information,
   wherein, if the created information is layer 2 (L2) trigger information, the controlling of the communication environment comprises disconnecting the mobile terminal from the relay device, when the relay device and the mobile terminal are connected via wire.

2. The method of claim 1, wherein the controlling of the communication environment comprises controlling a handover to another communication environment that is available to the mobile terminal.

3. The method of claim 1, wherein the L2 trigger information represents a change in a parameter value of a second layer according to the IEEE (Institute of Electrical and Electronic Engineers) 802.11 standards.

4. The method of claim 1, wherein the determining of whether a communication environment between the base station and the relay device changes is performed based on an intensity of a signal received from the base station, or a total number of beacon signals received from the base station per unit time.

5. A method of allowing a relay device to relay communication between a base station and a mobile terminal, the method comprising:
   determining whether a communication environment between the base station and the relay device changes;
   selectively creating information representing a change in the communication environment, based on the determination; and
   controlling, using a computer, a communication environment between the relay device and the mobile terminal, based on created information,
   wherein, if the created information is layer 2 (L2) trigger information, the controlling of the communication environment comprises weakening an intensity of a signal transmitted from the relay device to the mobile terminal, when the relay device and the mobile terminal are wirelessly connected.

6. A method of allowing a relay device to relay communication between a base station and a mobile terminal, the method comprising:
  determining whether a communication environment between the base station and the relay device changes;
  selectively creating information representing a change in the communication environment, based on the determination; and
  controlling, using a computer, a communication environment between the relay device and the mobile terminal, based on created information,
  wherein, if the created information is layer 2 (L2) trigger information, the controlling of the communication environment comprises setting a period of time during which a radio frequency (RF) signal is transmitted to the mobile terminal to be longer than a predetermined transmission period in order to determine whether the state of a wireless channel is good, when the relay device and the mobile terminal are wirelessly connected.

7. The method of claim 6, wherein the RF signal transmitted to the mobile terminal represents a beacon signal.

8. The method of claim 1, wherein the relay device is installed on a movable platform with the mobile terminal.

9. A method of allowing a relay device to relay communication between a base station and a mobile terminal, the method comprising:
  determining whether a communication environment between the base station and the relay device changes;
  selectively creating information representing a change in the communication environment, based on the determination; and
  transmitting the created information to the mobile terminal to control, using a computer, a communication environment between the relay device and the mobile terminal based on the change in the communication environment,
  wherein, if the transmitted information is first layer 2 (L2) trigger information representing a change in a parameter value of a second layer according to the IEEE (Institute of Electrical and Electronic Engineers) 802.11 standards that are used between the base station and the relay device, the controlling of the communication environment comprises creating second L2 trigger information representing a change in a parameter value of a second layer according to the IEEE 802.11 standards that are used between the relay device and the mobile terminal, and then performing a handover to another communication environment that is available to the mobile terminal, based on the created information.

10. The method of claim 9, wherein the relay device is installed on a movable platform with the mobile terminal.

11. A method of allowing a mobile terminal to communicate with a base station, via a relay device, the method comprising:
  if a communication environment between the base station and the relay device changes, receiving information representing the communication environment change from the relay device; and
  controlling, using a computer, a communication environment between the relay device and the mobile terminal based on the received information,
  wherein, if the received information is first layer 2 (L2) trigger information representing a change in a parameter value of a second layer according to the IEEE (Institute of Electrical and Electronic Engineers) 802.11 standards that are used between the base station and the relay device, the controlling of the communication environment comprises creating second L2 trigger information representing a change in a parameter value of a second layer according to the IEEE 802.11 standards that are used between the relay device and the mobile terminal, and then performing a handover to another communication environment that is available to the mobile terminal, based on the created information.

12. The method of claim 11, wherein the relay device is installed on a movable platform with the mobile terminal.

13. An apparatus for allowing a relay device to relay communication between a base station and a mobile terminal, the apparatus comprising:
  a determination unit to determine whether a communication environment between the base station and the relay device changes;
  an information generation unit to selectively create information representing the communication environment change based on the determination of the determination unit; and
  a controller to control a communication environment between the relay device and the mobile terminal based on the created information,
  wherein, if the created information is layer 2 (L2) trigger information, the controller disconnects the mobile terminal from the relay device when the relay device and the mobile terminal are connected via wire.

14. The apparatus of claim 13, wherein the controller controls a handover to another communication environment that is available to the mobile terminal.

15. The apparatus of claim 13, wherein the L2 trigger information represents a change in a parameter value of a second layer according to the IEEE (Institute of Electrical and Electronic Engineers) 802.11 standards.

16. The apparatus of claim 13, wherein the determination unit determines whether the communication environment between the base station and the relay device changes, based on an intensity of a signal received from the base station or a total number of beacon signals received from the base station per unit time.

17. An apparatus for allowing a relay device to relay communication between a base station and a mobile terminal, the apparatus comprising:
  a determination unit to determine whether a communication environment between the base station and the relay device changes;
  an information generation unit to selectively create information representing the communication environment change based on the determination of the determination unit; and
  a controller to control a communication environment between the relay device and the mobile terminal based on the created information,
  wherein, if the created information is layer 2 (L2) trigger information, the controller weakens the intensity of a signal transmitted from the relay device to the mobile terminal when the relay device and the mobile terminal are wirelessly connected.

18. An apparatus for allowing a relay device to relay communication between a base station and a mobile terminal, the apparatus comprising:
  a determination unit to determine whether a communication environment between the base station and the relay device changes;
  an information generation unit to selectively create information representing the communication environment change based on the determination of the determination unit; and a controller to control a communication environment between the relay device and the mobile terminal based on the created information, wherein, if the created information is layer 2 (L2) trigger information, the controller sets a period of time during which a radio frequency (RF) signal is transmitted to the mobile terminal to be longer than a predetermined transmission period in order to determine whether the state of a wireless channel is good, when the relay device and the mobile terminal are wirelessly connected.

19. The apparatus of claim 18, wherein the RF signal transmitted to the mobile terminal represents a beacon signal.

20. The apparatus of claim 13, wherein the relay device is installed on a movable platform with the mobile terminal.

21. An apparatus for allowing a mobile terminal to communicate with a base station via a relay, the apparatus comprising:

an information receiving unit to receive information representing a change in a communication environment between the base station and the relay device from the relay device if the communication environment changes; and a controller to control a communication environment between the relay device and the mobile terminal based on the received information, wherein, if the received information is first layer 2 (L2) trigger information representing a change in a parameter value of a second layer according to the IEEE (Institute of Electrical and Electronic Engineers) 802.11 standards that are used between the base station and the relay device, the controller creates second L2 trigger information representing a change in a parameter value of a second layer according to the IEEE 802.11 standards that are used between the relay device and the mobile terminal, and then performs a handover to a new communication environment that is available to the mobile terminal, based on the created information.

22. The apparatus of claim 13, wherein the mobile terminal comprises: an information receiving unit to receive information representing a change in a communication environment between the base station and the relay device from the relay device if the communication environment changes; and a controller arranged to control a communication environment between the relay device and the mobile terminal based on the received information.

23. An apparatus for allowing a relay device to relay communication between a base station and a mobile terminal, the apparatus comprising:

a determination unit to determine whether a communication environment between the base station and the relay device changes;

an information generation unit to selectively create information representing the communication environment change based on the determination of the determination unit; and a first controller to control a communication environment between the relay device and the mobile terminal based on the created information, wherein the mobile terminal comprises:

an information receiving unit to receive information representing a change in a communication environment between the base station and the relay device from the relay device if the communication environment changes; and a second controller to control a communication environment between the relay device and the mobile terminal based on the received information, and wherein, if the received information is first layer 2 (L2) trigger information representing a change in a parameter value of a second layer according to the IEEE (Institute of Electrical and Electronic Engineers) 802.11 standards that are used between the base station and the relay device, the second controller creates second L2 trigger information representing a change in a parameter value of a second layer according to the IEEE 802.11 standards that are used between the relay device and the mobile terminal, and then performs a handover to a new communication environment that is available to the mobile terminal, based on the created information.

24. An apparatus for allowing a relay device to relay communication between a base station and a mobile terminal, the apparatus comprising:

a determination unit to determine whether a communication environment between the base station and the relay device changes;

an information generation unit to selectively create information representing the communication environment change based on the determination of the determination unit; and a controller to control a communication environment between the relay device and the mobile terminal based on the created information, wherein the mobile terminal comprises:

a first network module arranged to communicate with the relay device, and provided to create layer 2 (L2) trigger information when an intensity of a radio-frequency (RF) signal received from the base station, via the relay device, is weakened or a period of time during which a beacon signal is transmitted from the base station, via the relay device;

a second network module arranged to communicate using a new communication environment that is available to the mobile terminal; and a handover module arranged to perform a handover to the new communication environment that is available to the mobile terminal upon receipt of the created L2 trigger information.

25. The apparatus of claim 24, wherein the created L2 trigger information represents a change in a parameter value of a second layer according to the (Institute of Electrical and Electronic Engineers) IEEE 802.11 standards that are used between the relay device and the mobile terminal.

* * * * *